United States Patent [19]

Tschanz et al.

[11] Patent Number: 4,509,387
[45] Date of Patent: Apr. 9, 1985

[54] ACTUATOR ASSEMBLY FOR REMOTELY CONTROLLING A VALVE

[75] Inventors: August E. Tschanz, Lansdale; Robert W. Geiger, Geigertown, both of Pa.

[73] Assignee: Teleflex Incorporated, Limerick, Pa.

[21] Appl. No.: 404,464

[22] Filed: Aug. 2, 1982

[51] Int. Cl.³ .............................................. G05G 1/08
[52] U.S. Cl. .................................. 74/505; 74/501 R; 251/294; 114/144 R
[58] Field of Search ............ 440/62; 114/144 R, 154, 114/160, 161; 74/501 R, 501 SA, 501 A, 505; 251/248, 249.5, 293, 294; 403/3, 4, 310, 313

[56] References Cited

U.S. PATENT DOCUMENTS

| | | | |
|---|---|---|---|
| 705,250 | 7/1902 | King | 251/248 |
| 1,547,196 | 7/1925 | Arbon | 251/294 |
| 1,580,877 | 4/1926 | Barber | 74/501 A |
| 1,754,310 | 4/1930 | Ellenberger | 251/293 X |
| 1,926,175 | 9/1933 | Richards | 74/505 |
| 2,048,398 | 7/1936 | Lasker | 74/501 X |
| 2,464,458 | 3/1949 | Newcomer | 251/248 X |
| 3,206,998 | 9/1965 | Matz, Jr. et al. | 74/501 A X |
| 3,208,300 | 9/1965 | Morse | 74/501 A X |
| 3,307,421 | 3/1967 | Gilmore | 74/501 A |
| 3,550,469 | 12/1970 | Morse | |
| 3,766,801 | 10/1973 | Wiegand | |
| 3,774,568 | 11/1973 | Borst et al. | 440/62 |
| 4,014,281 | 3/1977 | Hemens | 440/62 X |

FOREIGN PATENT DOCUMENTS

| | | | |
|---|---|---|---|
| 460773 | 6/1928 | Fed. Rep. of Germany | 251/294 |
| 792486 | 12/1935 | France | 251/294 |
| 1004247 | 3/1952 | France | 114/160 |
| 28650 | 10/1902 | United Kingdom | 251/294 |

OTHER PUBLICATIONS

Greenburg et al., Inexpensive Cryogenic Pressure-Vacuum Valve, 1/1978.

Primary Examiner—Kenneth J. Dorner
Assistant Examiner—Rodney M. Lindsey
Attorney, Agent, or Firm—Reising, Ethington, Barnard, Perry & Milton

[57] ABSTRACT

A valve actuating assembly (10) including an input housing (12) and a circular drive wheel (14) rotatably supported by the input housing (12) and having a cylindrical outer periphery with a plurality of parallel teeth (16). A drive gear (22) is rotatably supported by the input housing (12) and is in meshing engagement with the teeth (16) of the drive wheel (14). The input housing (12) has a first pair of cable guide tubes (24) disposed opposite to one another on opposite sides of the drive gear (22). An output housing (28) is identical to the input housing and supports a driven wheel which is identical to the drive wheel (14). A first conduit (30) is connected to and extends between one of the guide tubes (24) of the input housing (12) and one of the guide tubes of the output housing (28). A second conduit (31) is connected to and extends between the other of the guide tubes (24) of the input housing (12) and the other guide tube of the output housing (28). An endless flexible motion transmitting core element (38) is slidably disposed in the first and second conduits (30, 31) and the guide tubes (24) and is entrained about the drive (14) and driven wheels. The core element (38) moves longitudinally to rotate the drive (14) and driven wheels in a closed all-tension system.

16 Claims, 5 Drawing Figures

4,509,387

ACTUATOR ASSEMBLY FOR REMOTELY CONTROLLING A VALVE

TECHNICAL FIELD

The instant invention relates to an actuator assembly for remotely controlling a valve and, more specifically, to an assembly which utilizes a flexible motion transmitting core element to transmit motion in a curved path.

BACKGROUND ART

In such environments as boats, valves are often located at remote and inaccessible positions necessitating the use of remotely located actuator assemblies. Presently, these valves are operated by rod or torque cable systems which perform inefficiently and have a high failure rate. A rotary actuator assembly is an alternative to the prior art. The U.S. Pat. Nos. 3,550,469 to Morse and 3,766,807 to Wiegand teach rotary actuator assemblies of the type for longitudinally moving a flexible motion transmitting core element in a curved path. A push-pull cable and helical wheel system are used, which provide an efficient system in tension but such systems operate at low efficiency in compression. The instant invention provides an efficient actuating system, which is a closed system operating around two helical wheels thereby providing an all-tension actuating system.

STATEMENT OF THE INVENTION

In accordance with the present invention, there is provided a valve-actuating assembly including an input housing and a circular drive wheel rotatably supported by the input housing having a cylindrical outer periphery with a plurality of parallel teeth disposed about the outer periphery thereof and a drive cable groove extending radially into the outer periphery and circularly about the periphery of the wheel. The groove is semi-circular and has a plurality of equally spaced notches therein. A drive gear is rotatably supported by the input housing and is in meshing engagement with the teeth of the drive wheel. The input housing has a first pair of cable guide tubes disposed opposite to one another on opposite sides of the drive gear. The assembly further includes an output housing and a circular driven wheel rotatably supported by the output housing and having a cylindrical outer periphery with a plurality of parallel teeth disposed about the outer periphery thereof. A driven cable groove extends radially into the outer periphery and circularly about the periphery of the driven wheel. The driven groove is semi-circular and has a plurality of equally spaced notches therein. A driven gear is rotatably supported by the output housing and is in meshing engagement with the teeth of the driven wheel, the output housing having a second pair of cable guide tubes disposed opposite to one another on opposite sides of the driven gear. A first conduit is connected to and extends between the guide tubes of the input housing and one of the guide tubes of the output housing. A second conduit is connected to and extends between the other guide tubes of the input housing and the other guide tube of the output housing. An endless flexible motion transmitting core element is slidably disposed in the first and second conduits, the guide tubes being entrained about the drive and driven wheels. The core element is circular and disposed in the grooves of the wheels and has spaced radial protrusions therealong for engaging the notches in the grooves of the wheel so that the cable moves longitudinally to rotate the wheels in a closed all-tension system.

FIGURES IN THE DRAWINGS

An embodiment of a valve actuator assembly constructed in accordance with the present invention will now be described, by way of example only, with reference to the accompanying drawings in which.

DETAILED DESCRIPTION OF THE DRAWINGS

Figure 1:
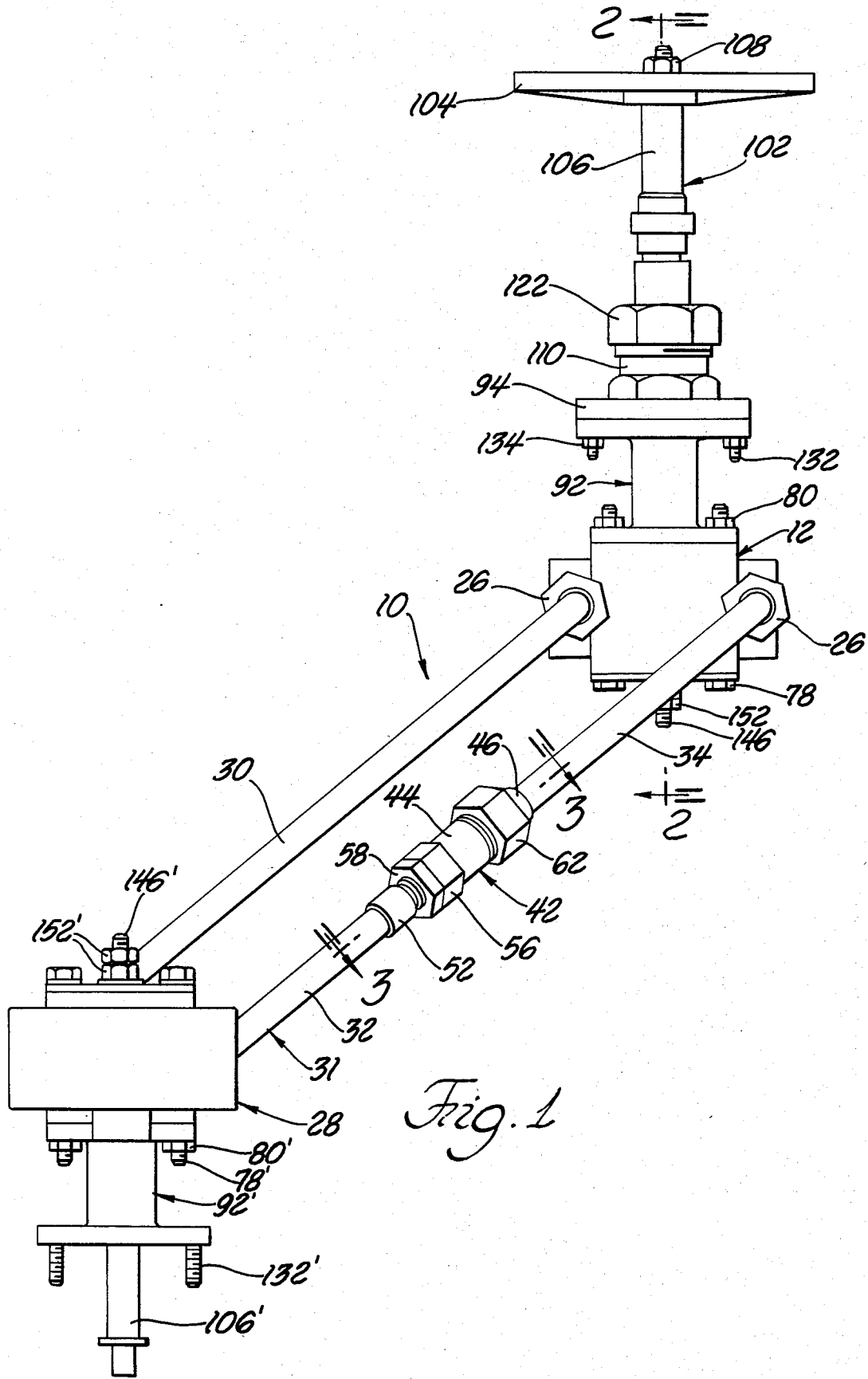
FIG. 1 is a perspective view of a valve actuator assembly constructed in accordance with the instant invention.

Referring to the drawings, a valve-actuating assembly constructed in accordance with the instant invention is generally shown at 10.

The assembly 10 includes an input housing, generally indicated at 12, and a circular drive wheel, generally indicated at 14, rotatably supported by the input housing 12. The drive wheel 14 has a cylindrical outer periphery with a plurality of parallel teeth 16 disposed about the outer periphery thereof. The drive wheel 14 further includes a drive cable groove 18 extending radially into and circularly about the outer periphery of the drive wheel 14. The drive cable groove 18 is semi-circular and has a plurality of equally spaced notches 20 therein.

A drive gear 22 is rotatably supported by the input housing 12 and is in meshing engagement with the teeth 16 of the drive wheel 14. The teeth 16 of the drive wheel 14 have peripheral edge portions that are spaced from the edge of the drive wheel 14. The teeth of the drive gear 22 engage the keyways defined by the spaces between the teeth 16 of the drive wheel 14. The drive wheel 14 and drive gear 22 are supported in the input housing 12 so that rotational actuation of the drive gear 22 drives and rotates the drive wheel 14.

The input housing 12 has a first pair of integral cable guide tubes 24 disposed opposite to one another on opposite sides of the drive gear 22. The guide tubes 24 have inner guide tracks 25 which form passageways leading from the drive wheel 14. Caps 26 include threaded inner surfaces which engage the threaded outer connecting surfaces of the guide tubes 24.

Figure 2:
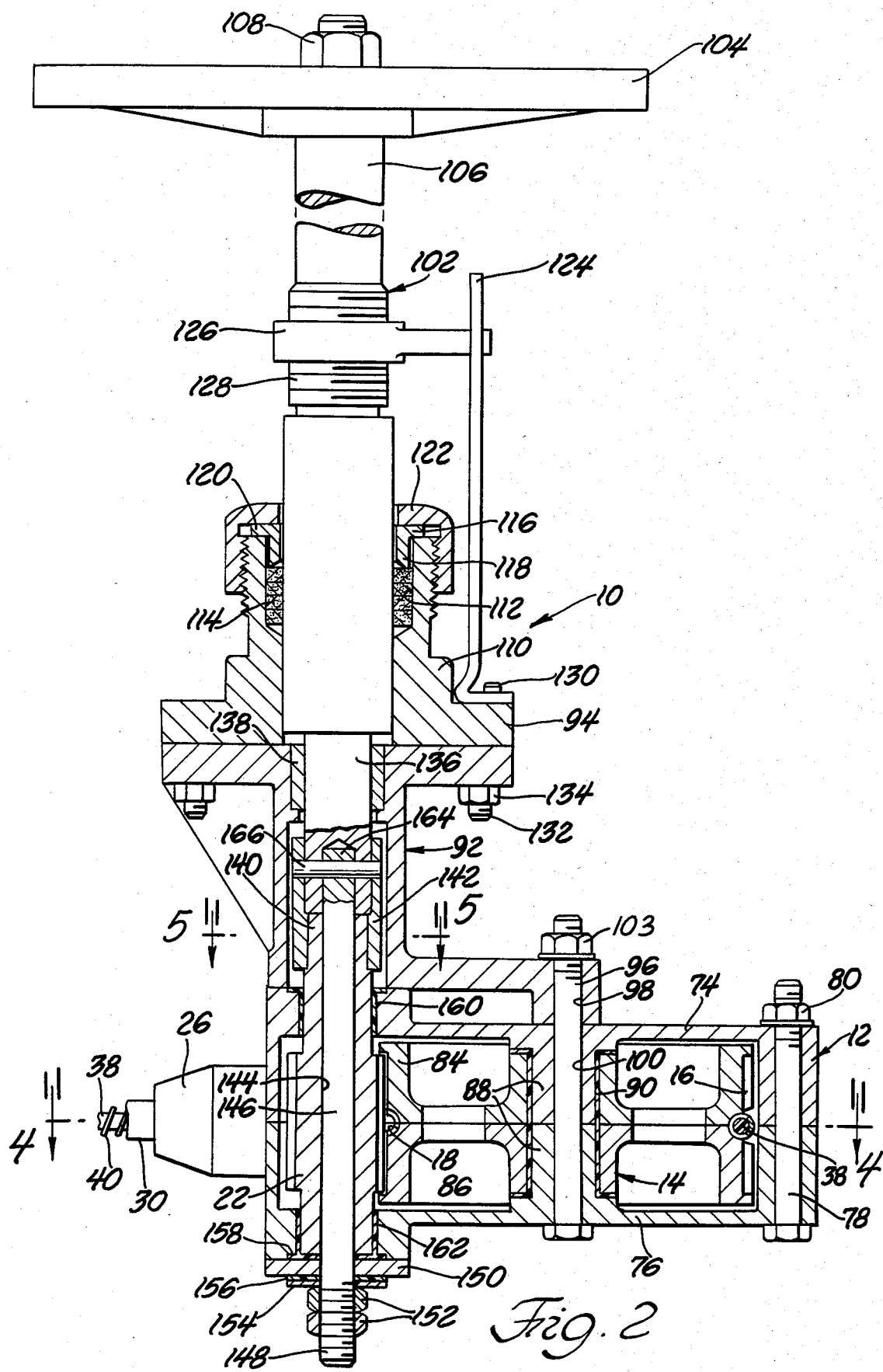
FIG. 2 is an enlarged cross-sectional view taken substantially along lines 2—2 of FIG. 1.
Figure 4:
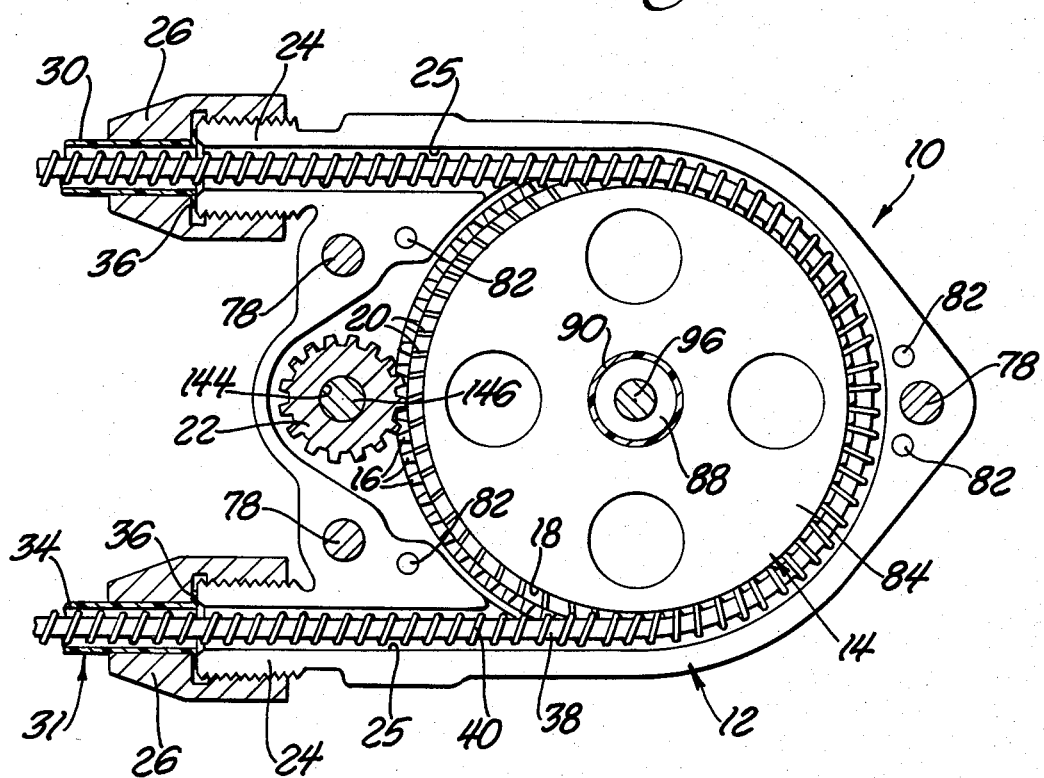
FIG. 4 is a cross-sectional view taken substantially along lines 4—4 of FIG. 2.

The assembly 10 further includes an output housing, generally indicated at 28 in FIG. 1. The output housing 28 houses a driven gear and driven wheel having the same construction to the drive gear 22 and drive wheel 14 housed within the drive housing 12, as shown in FIGS. 2 and 4. More specifically, the output housing 28 rotatably suports a circular driven wheel which has a cylindrical outer periphery with a plurality of parallel teeth disposed about the outer periphery thereof, as are the teeth 16 disposed about the outer periphery of the drive wheel 14. The driven wheel includes a driven cable groove extending radially into the outer periphery and circularly about the periphery of the driven wheel just as the drive wheel 14 includes a groove 18. The driven groove is semi-circular and has a plurality of equally spaced notches therein. A driven gear is rotatably supported by the output housing 28 just as the drive gear 22 is supported by the input housing 12. The driven gear is in meshing engagement with the teeth of the driven wheel. The output housing 28 has a second pair of cable guide tubes disposed opposite to one another on opposite sides of the driven gear in the same fashion as the disposition of the guide tubes 24 in relation to the drive gear 22.

A first conduit 30 is connected to and extends between one of the guide tubes 24 of the input housing 12 and one of the guide tubes of the output housing 28. A second conduit, generally shown at 31, has a first part 32 or length 32 extending from the other guide tube of the output housing 28 and a second part or length 34 extending from the other guide tube 24 of the input housing 12. The conduits 30 and 31 may include an outer jacket of high density linear polyethylene, internal lay wires of oil-tempered spring wire and an internal liner of high density linear polyethylene. As shown in FIG. 4, each conduit 30 and 31 has a flared end portion 36. The flared end portion 36 is clamped between the cap member 26 and tube guide 24 thereby retaining the end portions 36 of the conduits 30 and 31 in alignment with the guide tracks 25 within the guide tubes 24.

The assembly 10 further includes an endless flexible motion transmitting core element 38 slidably disposed in the first conduit 30 and the first and second parts 32 and 34 of the second conduit 31 and in the guide tracks 25 of the guide tubes 24 and entrained about the drive wheel 14 and driven wheel (not shown). The core element 38 is circular and disposed in the grooves 18 in the drive wheel 14 and driven wheel. The core element 38 has a core made of plow steel and has a helix wire 40 entrained therearound defining spaced radial protrusions for engaging the notches 20 in the grooves 18 of the drive wheel 14 and driven wheel so that the core element 38 moves longitudinally upon actuation of the assembly 10 to rotate the drive wheel 14 and driven wheel in a closed all-tension system. In other words, the core element 38 is tightly disposed about the drive wheel 14 and driven wheel in a closed system defined by the conduits 30 and 31 and the housings 12 and 28 to provide a closed system wherein the core element 38 is disposed around the drive wheel 14 and driven wheel. The helical wire 40 of the core element 38 is in tension engagement with both the drive wheel 14 and driven wheel during actuation. More specifically, upon actuation of the drive wheel 14, a tension engagement is developed between the protrusions defined by the helically wound wire 40 of the core element and the notches 20 of the inner groove 18 of the drive wheel 14 no matter what direction the drive wheel 14 is rotated. In other words, during actuation, one reach of the core element 38 is in tension between the drive and driven wheels. A similar all-tension engagement thereby drives the driven wheel in the output housing 28 as distinguished from a simple push-pull system having low efficiencies and loads in compression; that is, the drive wheel 14, via the endless core element 38, does not drive the driven wheel by compressing the core element 38 against the driven wheel but rather by tension of the core element 38 against the driven wheel. Hence, the instant invention provides a highly efficient all-tension control.

For the proper operation of the all-tension system, the endless core element 38 must be wound sufficiently tightly about the drive wheel 14 and driven wheel. Accordingly, once the core element 38 is disposed within the assembly 10 and the length thereof determined, the length of the conduit 31 having the first part 32 and the second part 34 is adjusted so as to adjust the length of the closed system in which the core element 38 passes, thereby properly disposing the core element 38 at a predetermined tension about the drive wheel 24 and driven wheel. The assembly 10 includes adjustment means, generally indicated at 42 in FIGS. 1 and 3 for adjusting the effective length of the first part 32 and second part 34 of the second conduit 31. More specifically, the adjustment means 42 includes a slider sleeve member 44. The slider sleeve member 44 slides over the conduit 34 when it is not secured thereto. The conduit 34 includes a headed sleeve 46 having a flared end portion 48. The slider sleeve member 44 has an outer threaded end portion 50 having an internal diameter which is greater than the external diameter of the flared end portion 48 of the headed sleeve 46 thereby allowing the slider sleeve member 44 to pass thereover when it is not fixedly connected in place. The other part 32 of the conduit 31 includes a threaded ferrule 52 having an end portion 54 disposed on the end portion thereof, the slider sleeve member 44 including an inner threaded end portion 56 for adjustably engaging the outer threaded terminal portion 54 of the ferrule 52. The adjustment means 42 further includes a jam nut 58, also engaging the outer threaded terminal portion 54 of the ferrule 52. The adjustment means 42 further includes spacer means comprising a split bushing 60 disposed within the slider sleeve member 44 for spacing apart the first and second parts 32, 34 of the conduit 31. The ends of the split bushing 60 engage the end portion 54 of the ferrule 52 and the end portion 48 of the headed sleeve 46. The assembly 10 includes adjustable connecting means for fixedly connecting the slider sleeve member 44 to the first and second parts 32, 34 of the conduit 31 whereby the connector means can be released to allow the slider sleeve member 44 to slide over the flange end portion 48 of the second part 34 so that the split bushing 60 can be removed to allow access to the core element 38. The adjustsble connector means includes the hex nut 58 and a connector nut 62 having a radially inwardly extending shoulder 64 for clamping the flanged end portion 48 of the headed sleeve 46 against the split bushing 60.

In operation, once the endless cable 38 is disposed within the assembly 10, the split bushing 60 is inserted between the first and second parts 32, 34 of the conduit 31 and, more particularly, between the end of the headed sleeve 46 and ferrule 52. The slider sleeve member 44 is moved over the flared end portion 48 of the headed sleeve 46 and attached to the threaded end portion 54 of the ferrule 52. The connector nut 62 is then threaded onto the threaded end portion 50 of the slider sleeve member 44 and the hex nut 58 is loosely connected to the threaded end portion 54 of the ferrule 52. The slider sleeve member 44 is adjusted to adjust the conduit length until the wheel load of the core element 38 upon the drive wheel 14 and driven wheel feels tight and then slightly backed off. The jam nut 58 and connector nut 62 are then tightened. It may be necessary to trim the length of the split bushing 60 to remove any remaining slack from the core element 38.

The slider sleeve member 44, the threaded ferrule 52, and the hex jam nut 58 may be made from aluminum. The headed sleeve 46 may be made from steel.

Figure 3:
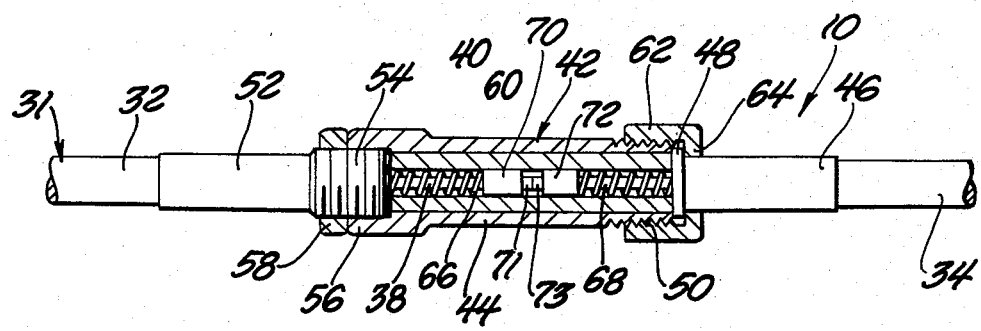
FIG. 3 is an enlarged fragmentary view partially in cross-section taken substantially along lines 3—3 of FIG. 1.

The core element 38 includes a first and second ends 66 and 68, respectively, as shown in FIG. 3. The assembly 10 includes joining means for joining together the first and second ends 66, 68 whereby a single core element may be made into an endless core element disposed about the assembly 10. The joining means includes an end member 70 disposed about the end portion 66 and an end member 72 disposed about the end portion 68. Each end member 70 and 72 has an internal female portion, each end portion 66 and 68 of the core element 38 being inserted into the female portion. The end members 70 and 72 are then swaged about the end portions 66 and 68 of the core element 38 thereby being connected thereto. The end member 70 has a male protrusion 71 extending therefrom and the end member 72 has a female protrusion 72 extending therefrom whereby the male protrusion 71 is inserted into the female protrusion and the female protrusion 72 is swaged thereover so as to connect the end members 70 and 72 together. Thusly, the core element 38 is an endless core element. It will be appreciated that the ends of the core element may be connected by various connections.

Upon assembling the assembly 10, an end member 70 or 72 is connected to an end portion 66, 68 of the core element 38. The adjustment means 42 is disconnected to allow access to the first and second parts 32, 34 of the conduit 31. The end portion 66, 68 of the core element 38 not having an end member 70, 72 thereon is inserted through one of the parts 32, 34 of the conduit 31 and entrained through the assembly 10 to extend out through the other of the parts 32, 34. The core element 38 is then cut to length and the other end member 70, 72 is swaged onto the core element 38 and the end members 70, 72 are connected together, as described above. The adjustment means 42 is then connected and adjusted so as to provide a tight fitting of the core element 38 about and between the drive wheel 14 and driven wheel.

As stated above, the input and output housings 12 and 28, respectively, are identical, as are the drive 14 and driven wheels and drive 22 and driven gears. Accordingly, the description below of the internal structure of the input housing 12 will be directed solely to the input housing 12 and drive wheel 14 and drive gear 22 but it will also describe in detail the identical driven wheel and gear and output housing 28. Like parts of the input and output housings are indicated by primed numerical designations on the output housing corresponding to like numbers on the input housing.

As shown in FIG. 2, the input housing 12 includes two housing halves 74 and 76 rotatably supporting the drive wheel 14. The housing halves 74, 76 are secured together by a plurality of bolts 78 and nuts 80. Pins 82 provide alignment of the housing halves 74, 76 during the assembly thereof.

The drive wheel 14 includes two wheel halves 84, 86 separated in a radial plane extending inwardly from each of the grooves 18. Each wheel half 84, 86 has a notch extending about the periphery thereof which, when the wheel halves 84, 86 are joined together, forms the groove 18. The two halves 84, 86 are rivetted together so that the teeth 16 extending outwardly therefrom match within plus or minus 0.003 inches to true position.

The input housing 12 includes an integral axle 88 extending inwardly from each of the wheel halves 84, 86 for rotatably supporting the drive wheel 14. A bushing 90 is disposed between the axles 88 and the drive wheel 14.

The assembly 10 includes an adapter or barrel housing, generally indicated at 92, for securing the input housing 12 to a support structure 94, as it does the output housing 28. A hex bolt 96 extends through an opening 98 in the adapter housing 92 and through an opening 100 extending through the axles 88 of the input housing 12 and a nut 103 for fixedly supporting the input housing 12 on the adapter housing 92.

The assembly 10 may be used on a boat wherein the input housing 12 is connected by the adapter housing 92 to a wheel assembly, generally indicated at 102 in FIGS. 1 and 2, and the output housing 28 is connected by the adapter housing 92 to the valve assembly. The wheel assembly 102 is disposed above the deck of the boat while the input housing 12 and output housing 28 would disposed below the deck of the boat.

As shown in FIGS. 1 and 2, the wheel assembly 102 includes a wheel member 104, generally made of cast brass, which is fixedly mounted on a drive shaft 106 by a hex nut 108. The hex nut 108 is generally a self-locking brass nut. The shaft 106 is supported by a housing which includes a stuffing box 110 having an inner surface defining a space 112 between the stuffing box 110 and the shaft 106. Packing 114, normally made from an asbestos material, is disposed in the space 112. A stuffing box gland 116, generally made from brass, includes a cylindrical body portion 118 which retains the packing 114 within the space 112 and a shoulder portion 120 which is clamped against the stuffing box 110 by a packing nut 122. An indicator 124 is secured to the assembly 10 by an indicator nut 126 which engages a threaded portion 128 of the shaft 106 and is also supported by a pin 130 extending upwardly from the stuffing box 110. The stuffing box 110 is made from cast steel and is secured to the adapter housing 92 by bolts 132 and nuts 134.

Figure 5:
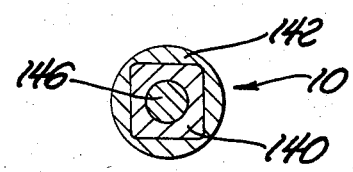
FIG. 5 is a cross-sectional view taken substantially along lines 5—5 of FIG. 2.

The shaft 106 is operatively connected to the drive gear 22 for rotation therewith. More particularly, the shaft 106 includes a cylindrical end portion 136 which is supported by a bushing 138 within the adapter housing 92. The drive gear 22 includes an end portion 140 which is substantially square when viewed in cross section and is shown in FIG. 5. The assembly 10 includes a connecting sleeve 142 having a first portion disposed about and fixedly connected to the cylindrical end portion 136 of the drive shaft 106 for rotation therewith and a second portion having a substantially square opening therethrough when viewed in cross section disposed about the square end portion 140 of the drive gear 22 so that the drive gear rotates with the drive shaft 106.

In operation, rotation of the wheel 104 is translated into rotation of the drive gear 22 by the drive shaft 106 as it is connected to the drive gear 22 by the sleeve 142. The drive gear 22 rotates the drive wheel 14 thereby actuating linear movement of the endless core element 38 so as to actuate rotation of the driven wheel within the output housing 28. Through exactly similar means, the driven gear actuates rotation of a driven shaft 106 having a configuration similar to the drive shaft 106. The driven shaft 106 is operatively connected to a rotary valve or through an adapter to a linerally actuated valve for actuating the opening and closing of the valve.

The assembly 10 includes torque drag adjustment means for adjusting the torque drag applied to the actuation of the drive gear 22 by applying a frictional resistance to the rotation of each of the drive and driven gears. The drive gear 22 includes an opening 144 extending longitudinally therethrough. The torque drag adjustment means includes a torque adjustment pin 146 extending through the opening 144 and having a threaded end portion 148 extending through the input housing 12. The input housing 12 includes a thrust plate 150 and nuts 152 engaging the torque adjustment pin 146 and abutting against the thrust plate 150. Washers 154, 156 and 158 are disposed on each side of the thrust plate and between the thrust plate 150 and the housing 12 and the nuts 152 and the thrust plate 150. Cylindrical bushings 160 and 162 are disposed between the housing 12 and the drive gear 22. The torque adjustment pin 146 includes a second end portion 164 extending into the cylindrical end portion 136 of the shaft 106. A mounting or roll pin 166 extends through the sleeve 142 and shaft 106 and the torque adjustment pin 146 for securing the torque adjustment pin 146 to the shaft 106 as well as securing the shaft 106 to the sleeve 142.

The torque drag adjustment means is operated by tightening the uppermost of the nuts 152 so as to tightly clamp the washers 154 and 156 against the thrust plate 150 thereby effectively clamping the drive gear 22 between the internal washer 158 and the shaft 136 as the torque adjustment pin 146 is connected to the drive shaft 106 by the roll pin 166. The uppermost nut 152 is then backed off one-half turn and the second of the nuts 152 is locked to the first nut 152 so that the washers 154, 156 are free to rotate.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An actuator assembly (10) comprising; an input housing (12), a circular drive wheel (14) rotatably supported by said input housing (12) and having a cylindrical outer periphery with a plurality of parallel teeth (16) disposed about said outer periphery thereof and a drive cable groove (18) extending radially into said outer periphery and circularly about said outer periphery of said drive wheel (14), said drive cable groove (18) being semi-circular and having a plurality of equally spaced notches (20) therein, a drive gear (22) rotatably supported by said input housing (12) and in meshing engagement with said teeth (16) of said drive wheel (14), said input housing (12) having a first pair of cable guide tubes (24) disposed opposite to one another on opposite sides of said drive gear (22); an output housing (28), a circular driven wheel rotatably supported by said output housing and having a cylindrical outer periphery with a plurality of parallel teeth disposed about said outer periphery thereof and a driven cable groove extending radially into said outer periphery and circularly about said periphery of said driven wheel, said driven groove being semi-circular and having a plurality of equally spaced notches therein; a driven gear rotatably supported by said output housing (28) and in meshing engagement with said teeth of said driven wheel, said output housing (28) having a second pair of cable guide tubes disposed opposite to one another on opposite sides of said driven gear; a first conduit (30) connected to and extending between one of said guide tubes (24) of said input housing (12) and one of said guide tubes of said output housing (28); a second conduit (31) connected to and extending between the other guide tube (24) of said input housing (12) and the other guide tube of said output housing (28); and endless flexible motion transmitting core element (38) slidably disposed in said first and second conduits (30,31) and said guide tubes (24) and entrained about said drive (14) and driven wheels, said core element (38) being circular and disposed in said grooves (18) in said drive (14) and driven wheels, said core element (38) having spaced radial protrusions therealong for engaging said notches (30) in said grooves (18) of said drive (14) and driven wheels so that said core element (38) moves longitudinally to rotate said drive (14) and driven wheels in a closed all-tension system, at least one of said conduits (31) including first and second parts (32,34); and adjustment means (42) including a slider sleeve member (44) for sliding over said second part (34) of said conduit (31) when not secured thereto and spacer means (60) disposed within said slider sleeve member (44) for spacing apart said first and second parts (32,34) of said conduit (31) and adjustable connecting means for fixedly connecting said slider sleeve member (44) to said first and second parts (32,34) whereby said adjustable connecting means can be released to allow said slider sleeve member (44) to slide over said second part (34) and said spacer means (60) can be removed to allow access to said core element (38).

2. An assembly as set forth in claim 1 wherein said second part (34) of said conduit (31) includes a flanged end portion (48) with an outer diameter, said slider sleeve member (44) having an outer threaded end portion (50) and said adjustable connecting means including a connector nut (62) having a radially inwardly extending shoulder (64) for clamping said flanged end portion (48) against said spacer means (60).

3. An assembly as set forth in claim 1 or 2 wherein said first part (32) of said conduit (31) includes an outer threaded terminal portion (54), said slider sleeve member (44) including an inner threaded end portion (56) for adjustably engaging said outer threaded terminal portion (54), said adjustment means (42) further including a jam nut (58) engaging said outer threaded terminal portion (54) for locking said slider sleeve member (44) thereon at a position to take up the slack of said core element (38).

4. An assembly as set forth in claim 1 wherein said spacer means (60) includes a cylindrical bushing (60) split longitudinally into two bushing halves and disposed between said first and second parts (32, 34) of said conduit (31) and within said slider sleeve member (44).

5. An assembly as set forth in claim 1 wherein said core element (38) includes first and second ends (66, 68), said assembly (10) including joining means (70, 72) for joining together said first and second ends (66, 68).

6. An assembly as set forth in claim 1 wherein said input and output housings (12, 28) are identical and said drive (14) and driven wheels and drive (22) and driven gears are identical.

7. An assembly as set forth in claim 6 wherein each of said input and output housings (12, 28) include two housing halves (74, 76) rotatably supporting said drive (14) and driven wheels.

8. An assembly as set forth in claim 7 wherein each of said drive (14) and driven wheels include two wheel halves (84, 86) separated in a radial plane extending inwardly from each of said grooves (18).

9. An assembly as set forth in claim 8 wherein each of said input and output housings (12, 28) include an integral axle (88) extending inwardly into each of said wheel halves (84, 86) for rotatably supporting said drive (14) and driven wheels.

10. An assembly as set forth in claim 9 including first and second adapter housings (92) for securing each of said input and output housings (12, 28) to a support structure (94) and an axle bolt (96) extending through said integral axle (88) of each of said input and output housings (12, 28) for fixedly supporting said input and output housings (12, 28) on said adapter housings (92).

11. An assembly as set forth in claim 10 including a plurality of securing bolts (78) disposed through said input and output housing halves (74, 76) for securing said input and output housing halves (74, 76) together.

12. An assembly as set forth in claim 1 including input means for actuating said drive and driven gears, said input means including first and second drive shafts (106, 106') operatively connected to each of said drive and driven gears respectively for rotation therewith.

13. An assembly as set forth in claim 12 wherein said first and second drive shafts (106, 106') includes a cylindrical end portion (136) and said drive and driven gears each include an end portion being substantially square when viewed in cross section, said assembly (10) including a connecting sleeve (142) having a first portion disposed about and fixedly connected to each of said cylindrical end portions (136) of said first and second drive shafts (106, 106') for rotation therewith and a second portion having a substantially square opening therethrough when viewed in cross section disposed about each of said square end portions of said drive and driven gears so that said drive and driven gears rotate with said first and second drive shafts (106, 106').

14. An assembly as set forth in claim 13 including torque drag adjustment means for applying a frictional resistance to the rotation of each of said drive and driven gears.

15. An assembly as set forth in claim 14 wherein said drive and driven gears each include an opening (144) extending longitudinally therethrough, said torque drag adjustment means including a torque adjustment pin (146) extending through each of said openings (144) with each pin (146) having a threaded end portion (148) extending through said input and output housings (12,28) and a second end (164) extending into said cylindrical end portion (136) of one of said drive and driven shafts (106), said torque drag adjustment means further including a mounting pin (166) extending through each of said sleeves (142) and said first and second drive shafts (106,106'), and said torque adjustment pin (146) for securing said torque adjustment pin (146) to said drive and driven shafts (106,106'), and a pair of nuts (152) adjustably engaging each of said threaded end portions (148) and said input and output housings (12,28) outside of said input and output housings (12,28).

16. An assembly as set forth in claim 1 wherein each of said teeth (16) of said drive (14) and driven wheels have peripheral edge portions spaced from the edge of each of said drive (14) and driven wheels.

* * * * *